(12) United States Patent
Heintel et al.

(10) Patent No.: US 10,951,622 B2
(45) Date of Patent: Mar. 16, 2021

(54) DEVICE FOR USE IN A NETWORK

(71) Applicant: SIEMENS AKTIENGESELLSCHAFT, Munich (DE)

(72) Inventors: Markus Heintel, Munich (DE); Amine Mohamed Houyou, Jersey City, NJ (US)

(73) Assignee: Siemens Aktiengesellschaft, Munich (DE)

( * ) Notice: Subject to any disclaimer, the term of this patent is extended or adjusted under 35 U.S.C. 154(b) by 35 days.

(21) Appl. No.: 15/769,913

(22) PCT Filed: Oct. 22, 2015

(86) PCT No.: PCT/EP2015/074498
§ 371 (c)(1),
(2) Date: Apr. 20, 2018

(87) PCT Pub. No.: WO2017/067599
PCT Pub. Date: Apr. 27, 2017

(65) Prior Publication Data
US 2018/0324187 A1    Nov. 8, 2018

(51) Int. Cl.
*H04L 29/06* (2006.01)
*H04L 29/08* (2006.01)
*H04W 12/00* (2021.01)

(52) U.S. Cl.
CPC ............ *H04L 63/102* (2013.01); *H04L 63/00* (2013.01); *H04L 63/08* (2013.01);
(Continued)

(58) Field of Classification Search
CPC ....... H04L 63/102; H04L 63/00; H04L 63/08; H04L 67/1042
See application file for complete search history.

(56) References Cited

U.S. PATENT DOCUMENTS 6,035,405 A * 3/2000 Gage .................... H04L 12/4608
709/227
6,178,505 B1 * 1/2001 Schneider ........... H04L 63/0218
713/168

(Continued)

FOREIGN PATENT DOCUMENTS

CN      101035016 A    9/2007
EP        0924900 A2   6/1999
(Continued)

OTHER PUBLICATIONS

PCT International Search Report dated Jun. 30, 2016 corresponding to PCT International Application No. PCT/EP2015/074498 filed Oct. 22, 2015.
(Continued)

*Primary Examiner* — William G Trost, IV
*Assistant Examiner* — Monishwar Mohan
(74) *Attorney, Agent, or Firm* — Lempia Summerfield Katz LLC (57) ABSTRACT

A method and device are provided for use in a network including at least one existing device. At least one virtual sub-network is established within the network and a certain trust level is assigned to the at least one virtual sub-network. The device is assigned a first trust level. The device receives a token correlated with the assigned first trust level. The device is permitted into the at least one virtual subnet upon presentation of that token if the first trust level corresponds or includes the certain trust level.

19 Claims, 3 Drawing Sheets

(52) U.S. Cl.
CPC ...... *H04L 67/1042* (2013.01); *H04L 67/1068* (2013.01); *H04L 69/329* (2013.01); *H04W 12/00503* (2019.01); *H04W 12/00505* (2019.01)

(56) References Cited

U.S. PATENT DOCUMENTS

| | | | | |
|---|---|---|---|---|
| 6,609,198 | B1* | 8/2003 | Wood | G06F 21/31 713/155 |
| 6,668,322 | B1* | 12/2003 | Wood | G06F 21/41 713/182 |
| 6,892,307 | B1* | 5/2005 | Wood | G06F 21/41 713/155 |
| 9,578,014 | B2* | 2/2017 | Sondhi | H04L 63/0815 |
| 2005/0015805 | A1* | 1/2005 | Iwamura | H04B 3/54 725/79 |
| 2005/0289349 | A1* | 12/2005 | Franke | H04L 9/3247 713/176 |
| 2007/0135960 | A1* | 6/2007 | Shibao | G05B 19/4185 700/197 |
| 2008/0108048 | A1* | 5/2008 | Bartee | G05B 13/048 435/3 |
| 2013/0046696 | A1* | 2/2013 | Radhakrishnan | G06Q 20/32 705/65 |
| 2013/0047199 | A1* | 2/2013 | Radhakrishnan | G06F 21/34 726/1 |
| 2013/0047200 | A1* | 2/2013 | Radhakrishnan | G06F 21/34 726/1 |
| 2013/0047201 | A1* | 2/2013 | Radhakrishnan | G06F 21/32 726/1 |
| 2013/0047202 | A1* | 2/2013 | Radhakrishnan | G06F 21/32 726/1 |
| 2013/0047204 | A1* | 2/2013 | Radhakrishnan | G06F 21/335 726/1 |
| 2013/0047206 | A1* | 2/2013 | Radhakrishnan | G06F 21/335 726/1 |
| 2013/0047211 | A1* | 2/2013 | Radhakrishnan | G06Q 20/4016 726/3 |
| 2013/0047263 | A1* | 2/2013 | Radhakrishnan | H04L 63/0807 726/27 |
| 2014/0223583 | A1* | 8/2014 | Wegner | G06F 30/00 726/33 |
| 2014/0297206 | A1* | 10/2014 | Silverman | G01R 22/063 702/58 |
| 2015/0089623 | A1* | 3/2015 | Sondhi | H04L 63/0807 726/9 |
| 2015/0220917 | A1* | 8/2015 | Aabye | H04L 9/3268 705/64 |
| 2016/0164832 | A1* | 6/2016 | Bellagamba | H04L 63/0281 726/12 |
| 2016/0212116 | A1* | 7/2016 | Becker | H04L 63/08 |
| 2016/0371617 | A1* | 12/2016 | Mullaney | G06Q 10/0635 |
| 2018/0039257 | A1* | 2/2018 | Houyou | G05B 19/41855 |

FOREIGN PATENT DOCUMENTS

| | | | | |
|---|---|---|---|---|
| EP | 2816760 | A1 * | 12/2014 | ........... H04L 63/108 |
| EP | 2816760 | A1 | 12/2014 | |
| GB | 2435115 | A | 8/2007 | |
| WO | WO2014169735 | A1 | 10/2014 | |

OTHER PUBLICATIONS

Chinese Office Action for Chinese Application No. 201580084010.0 dated Apr. 3, 2020.

* cited by examiner

DEVICE FOR USE IN A NETWORK

CROSS REFERENCE TO RELATED APPLICATION

The present patent document is a § 371 nationalization of PCT Application Serial Number PCT/EP2015/074498, filed Oct. 22, 2015, designating the United States, which is hereby incorporated by reference in its entirety.

FIELD

Embodiments relate to a device for use in a network, a controller, a network and a method for integrating a device in a physical network.

BACKGROUND

IT (information technology) systems are used for control and supervision of complex systems that are used for, e.g., traffic control, industrial automation, etc. For exchange of information, the systems are linked by interfaces. Some interfaces are used, e.g., for core functions, others for integrating office IT systems.

However, security risks arise due to the increasing degree of integration, the change from closed, domain specific networks such as, e.g., field bus systems as Profibus, CAN, etc., to open communications standards such as Ethernet, TCP/IP, WiFi, or Ethernet based industrial network technologies such as Profinet, Ethernet/IP, EtherCAT etc., access from public networks, e.g., from the Internet, a geographical spread of the systems, e.g., because cloud services are integrated, or varying security requirements due to the lifecycle of the system, e.g., during bootstrapping or operation.

Information security, e.g., who is allowed to access what information from systems cut off from the outside world, and functional safety, e.g., may an attack or a falsely configured sub-system affect negatively the overall system, should be maintained.

Networks used for industrial automation are referred to as production networks and may include several production devices or modules, e.g., a conveyer belt or milling machine, that offer production services, e.g., transporting or milling. Once a production network is set up, changing the production network is labor intensive. To facilitate this process and enable plug & automate, in the context of industrial automation, cyber physical production systems (CPPS) are used that include cyber physical production modules (CPPM) that offer an interface to a communication network.

Cyber-Physical Systems (CPS) may refer to integrations of computation with physical processes. Embedded computers and networks monitor and control the physical processes, for example, with feedback loops where physical processes affect computations and vice versa. Cyber-physical systems include a combination of real or physical objects with virtual objects that process information. The combination is realized by using open, connected information networks.

For classical production and automation networks the security problem is solved by using a "cell security concept", where the network is separated into a plurality of protected cells. The transition between cells as well as the transition to a surrounding network such as office IT or a public network is realized by special security modules. The individual security cells are formed according to geographical, e.g., location, or functional, e.g., production lines.

The structure of the security cells may be mapped to the physical structure of the network. The fixed connections of the communication infrastructure hamper service and restructuring of a production plant. Apart from engineering tasks for the production process, additional effort is required for engineering tasks for the communication network and network security.

An example of such approaches may be found in EP 2 816 760 A1, which relates to a method, a server, and a client for providing secured communication in a power distribution communication network.

SUMMARY AND DESCRIPTION

The scope of the present disclosure is defined solely by the appended claims and is not affected to any degree by the statements within this summary. The present embodiments may obviate one or more of the drawbacks or limitations in the related art.

Embodiments provide a device for use in a network including at least one existing device. Within the network at least one virtual sub-network is established, e.g., a logical sub-network is created on the actual, physical network. A certain trust level is assigned to the at least one virtual sub-network. The device is assigned a first trust level and receives a token. Upon presentation of that token entry into the at least one virtual subnet is permitted, if the first trust level corresponds or includes the certain trust level.

Trust levels correspond to each other, if a request for an entry in a virtual sub-network is evaluated positively, e.g., because the device is contained in or set onto a list of allowed devices in a network, e.g., a white list.

According to an embodiment, a new device sends a request for entry into a network or a virtual sub-network. The request is evaluated by a central authentication instance, e.g., by a comparison of identity data of the device with a list of allowed devices or by human intervention. If the evaluation includes a positive result, the device receives an identity certificate or token, that may be then used to enter one or more virtual sub-networks.

According to another embodiment, a device is already a member of a sub-network, that includes other existing devices. The device receives by one of the existing devices a confirmation that the device owns the capabilities for a specific task. Upon showing that confirmation to an entity responsible for establishing sub-networks, a sub-network for the specific task is re-configured or established and the device is allowed to enter.

The certain trust level corresponds to a security requirement, e.g., a device type or location of the device, or one or more capabilities required in the sub-network, e.g., the ability to use a certain encryption method or performing a specific production task. Further, the first trust level may denote rights, that are assigned to the device depending on device properties or on the status of the integration of the device into the network.

Embodiments further provide a corresponding controller that coordinates the access of a device to a virtual sub-network and a network including at least one device and a controller and a corresponding method.

Embodiments further provide a corresponding computer program and a data carrier for storing the computer program.

DETAILED DESCRIPTION

Embodiments provide for systems and production plants that adapt themselves autonomously. The structure of the systems and production plants may be made independent from the physical layout or topology of the communication network. In addition to wire-bound or alternatively, wireless technologies such as WiFi may be applied. However, for safety and security aspects an arbitrary access to all components of the production network may not be available.

For example, the operation of industrial networks may respect safety aspects, such as e.g. no one is harmed by robots etc. Operation may require that there is a certain level of IT security, e.g., to determine who may access and interact with the respective machine, or/and a certain level of reliability, e.g., to provide that the machine interaction with other is not corrupted or/and lossy or/and faulty.

The communication network may be segmented into virtual (sub)-networks that are referred to as "slices". A slice provides a requested set of communication resources and thus meets the requirement of an application, e.g. real-time control, surveillance etc.

The segmentation into virtual sub-networks or subnets may consider one or more of the aspects below:

i.) functional requirements stemming from the production process: the individual virtual subnets correspond to functional blocks for performing a current task or production act in the application plane, e.g. the manufacturing of a work piece.

ii.) geographical position of the individual components: the geographical position may be determined by methods for automatic location. The components of a predetermined area, e.g. working are may be combined automatically as a virtual subnet.

iii.) quality requirements for the communication: different tasks in the production process require different way of communicating. Communication having real-time requirements may be realized in a virtual subnet or segment of the network separated from the "normal" network traffic. Access to this virtual subnet may be safeguarded with additional security provisions, such as a strong authorization process.

Functional virtual subnets or slices are determined at the beginning of a task using a formal description of the process to be performed. A formal description may be obtained e.g. by ISA 95 process segment model. After completion of the task, the virtual subnets may be released or disintegrated.

The communication facility is available only for the specified task, which supports access control.

For a specific production act, a segmentation of the production network into virtual subnets or cells is achieved analogously to the static cell protection concept in the plane of the physical network.

Figure 1:
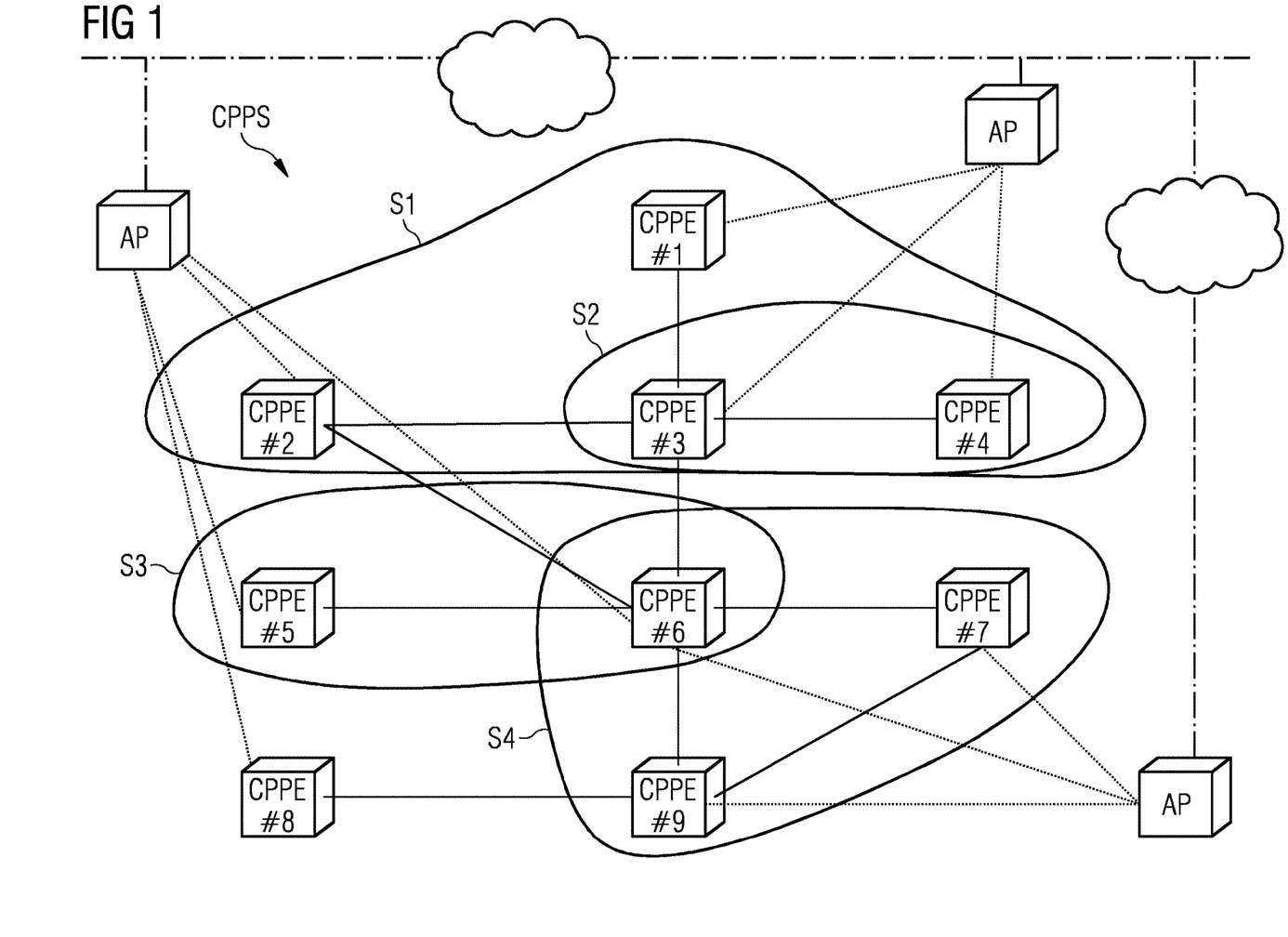
FIG. 1 depicts a cyber physical production system (CPPS) including a plurality of cyber physical production equipment (CPPE) that are grouped in various virtual sub-networks according to an embodiment.

In FIG. 1, an embodiment of cyber-physical production modules or equipment (CPPE) forming a cyber physical production system (CPPS) is depicted. The CPPS includes at least one cyber-physical production equipment or module CPPE and supporting IT-equipment such as an access point AP, a communication network, or a certification authority A cyber-physical production module or CPPE that is denoted by CPPE #x, x varying from 1 to 9, may be included in, e.g., a conveyor belt, a milling machine, or a robot having communication interfaces, (e.g., an interface to a communication network), the interface providing communication between members of the network.

The solid lines describe a functional relationship in the production network, e.g., a transport connection between CPPE's or cooperation between two or more CPPE's, e.g., a robot handing work pieces to one or more other CPPE.

The dotted lines describe a physical topology of the communication infrastructure between the CPPEs and access points AP. The example in FIG. 1 depicts a wireless local area network (WLAN) with a plurality of access points AP.

Segments or slices or virtual subnets S resulting from functional requirements are surrounded by a dashed line and are shaded in different tones of grey. The CPPEs, e.g., at a certain location or CPPE forming a transportation line may be combined. In FIG. 1, the devices CPPE #1 to CPPE #4 being closely together are combined thus forming the slice S1. A further slice S2 is formed by the device CPPE #3 and the device CPPE #4, thus providing an interaction between, e.g., a robot and a conveyor belt. Further slices S3, S4 are formed for further tasks or applications.

The installation or enforcement of slices or virtual subnets S may be realized by a number of different network components. Special network equipment such as router, access points AP are used. Alternatively, or additionally, a network stack of the individual components, in the example of FIG. 1 the CPPE's may be used.

If no tailored equipment is used, e.g., in the case of a P2P meshed network, each peer is controlling its neighbor. Alternatively, or additionally, the use of an, for example, trustworthy, network component on or at each node is envisaged.

Trustworthy may be defined in relation to the context the network component is used, e.g., criteria are provided for the assessment of trustworthiness in the specific situation. For example, in a situation, an especially shielded or/and certified network component or network interface card. A certification may be proved to a communication partner by remote attestation.

Segmentation may be enforced by appropriate, common security parameters, e.g., one or more cryptographic key(s). Devices/nodes may be segmented according to the use of security mechanisms on different ISO/OSI layers. For example, a segmentation may be done into a subgroup using the encryption method WPA (Wi-Fi protected access), used on OSI layer 2 or a VPN (virtual private network) using IPSec (Internet Protocol Security) on layer 3. The security parameters may be configured to the desired level of security assigned to a slice, e.g., in view of encryption strength, lifetime of security credentials, e.g., after which time or an event, a certificate has to be renewed, anonymity requirements, e.g., the use of a pseudonym, traceability, for example, how an access may be reconstructed.

The resulting dynamic slice structure may be monitored by using predetermined or dynamically created metrics. According to an embodiment, the number of components is restricted. States that may indicate an attack, e.g. a singular, large slice, may be detected or prevented.

Figures 2, 2A, 2B:
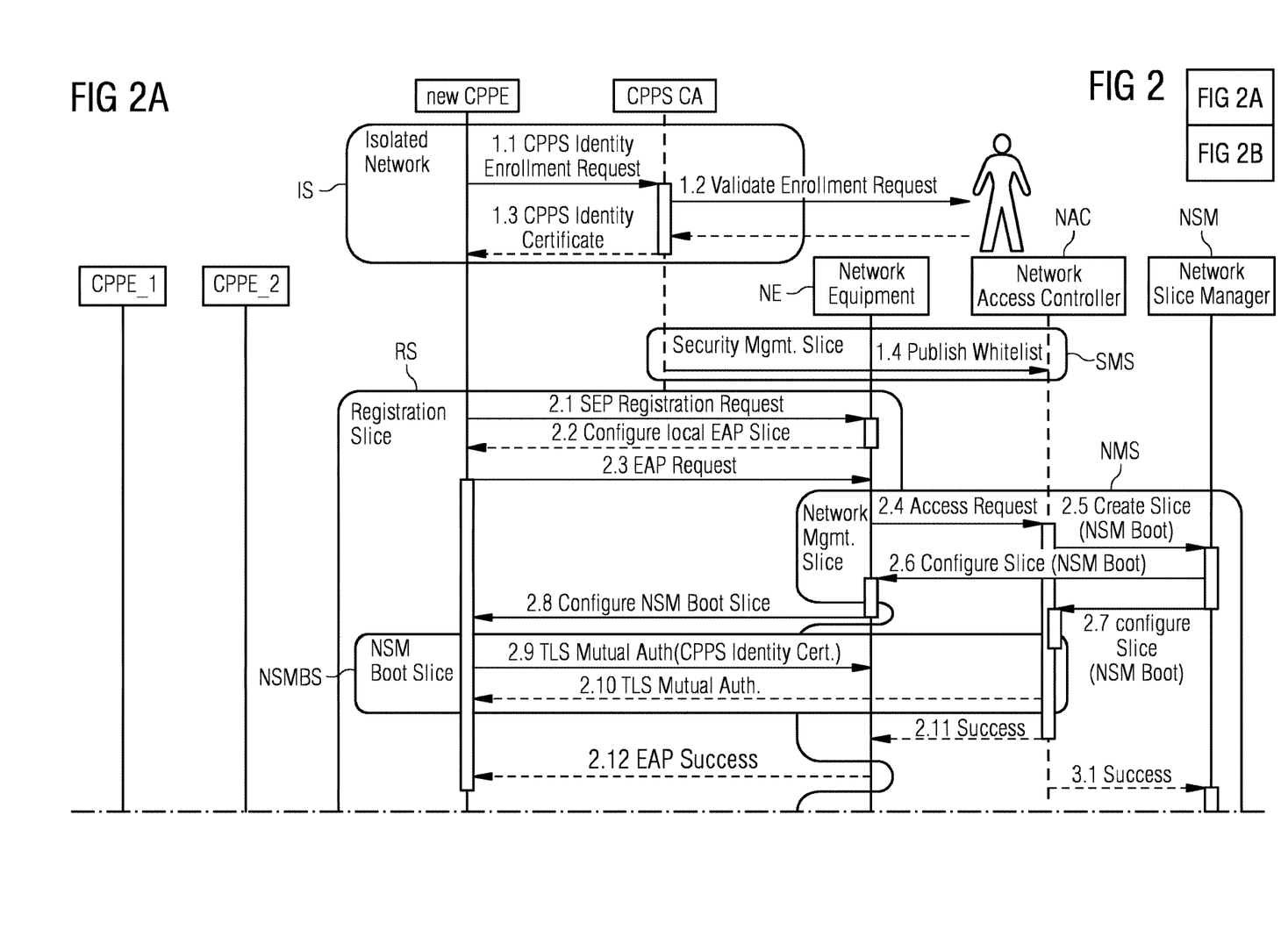
FIG. 2 depicts a sequence chart describing the access of a new device into a physical network including various virtual sub-networks according to an embodiment.
Figure 2B:
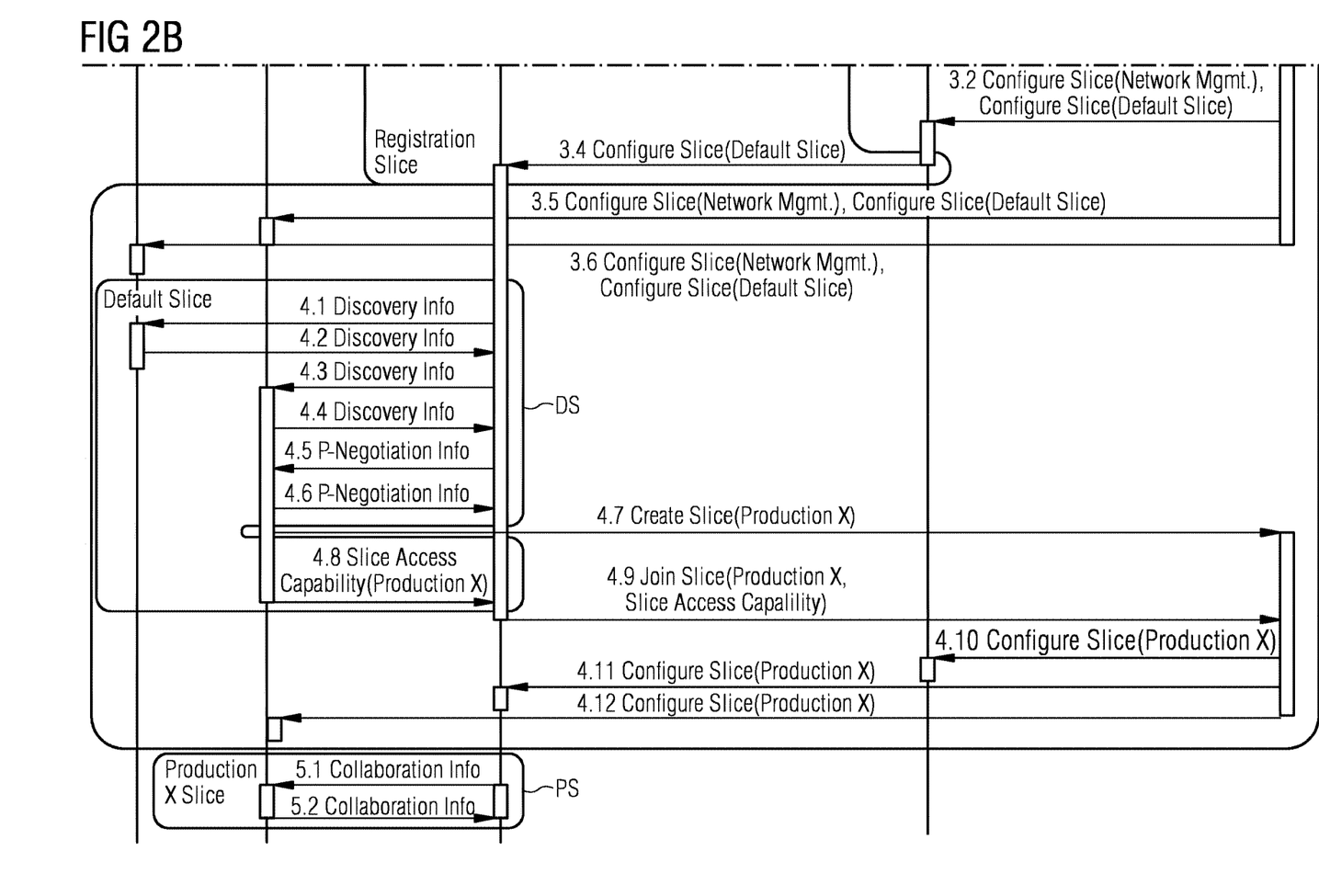

In FIG. 2, an embodiment is depicted illustrating the network bootstrapping process for a CPPE, e.g. the process of integrating the CPPE into the CPPS network, involving the CPPE into the physical network or/and providing access to the production network, or/and the security bootstrapping process, e.g. providing the relevant security token(s) or/and measure(s), that the CPPE may access the desired slice. In the example there is an increase of safety requirements from a low level during the discovery phase to a very high level during the production process of the CPPS.

FIG. 2 depicts the bootstrap sequence for a new device new CPPE joining the CPPS. The time axis is evolving from top to bottom. The sequence diagram depicts the interaction between the different components along a lifeline or time axis. The head of each lifeline identifies the component. Messages between components are represented with horizontal arrows. The correlation of the communication messages and the network slices used to exchange these messages is illustrated by the differently shaded background. Each slice is identified by an individual grey shade.

In the embodiment of FIG. 2 the following components are involved:

The old devices "CPPE_1, "CPPE_2" denote CPPE's that have already been installed in the CPPS. Thus, the old devices have already access to a specific set of virtual sub-networks or slices.

The new device "new CPPE" denotes the CPPE which is about to join the CPPS. Hence, at the beginning, the new device is not assigned any rights within the physical network and subnets.

The certification authority CPPS_CA represents the CPPS's certification authority issuing CPPS identity certificates.

Network Equipment NE denotes all type of active network components building the CPPS's physical communication infrastructure, e.g. routers or switches and access points, e.g. WiFi access points. A network access controller "NAC" manages network access control.

A network slice manager NSM manages and supervises the configuration of network slices for the logical communication topology.

In the example of FIG. 2, the "old" or already installed devices CPPE_1 and CPPE_2 have successfully completed bootstrapping and plug procedures. There is an existing security management slice SMS used to share information between the CPPS identity management system and the network access control system. The security management slice SMS contains the certification authority CPPS CA and the network access controller NAC.

By the certification authority CPPS CA a token is provided, that includes an identity certificate of the physical network. The token is sent from a central certification authority of the network.

Alternatively, or additionally a token is provided by an already existing, old device, e.g. in FIG. 2 the devices CPPE_1 and CPPE_2.

There is an existing network management slice NMS used to share information among the individual slice enforcement points SEPs representing the network slice system or network management slice NMS. The network management slice NMS contains the old devices CPPE_1, CPPE_2, the network equipment NE, the network access controller NAC, and the network slice manager NSM.

There is an existing default slice DS used to exchange discovery and plug-negotiation information between CPPE's that are already installed in the CPPS and newly accessing devices.

The new device newCPPE completes the CPPS enrolment process. The acts of the enrollment process are denoted with "1.x", x ranging from 1 to 4 in the example in FIG. 2.

When the enrollment process is successful, the new device newCPPE receives a CPPS Identity Certificate (1.3). The enrollment process takes place in a dedicated isolated and trusted environment, in the example in FIG. 2 in the isolated network IS. The process may rely on additional out-of-band, e.g. an independent communication channel that may be realized by using a local interface, information exchange to validate the certification request. According to an embodiment, the process involves human operation at least once.

Additionally, or alternatively, in the case that a CPPE is relocated to another CPPS, for future procedures, information gathered during this first enrolment process may be relied on.

Alternatively, in the case a very high level of security is required or the device could be externally changed or manipulated, an enrollment is started all over again. According to an embodiment, the use of already gained information depends on the type of the device that wants to access a network.

The certification authority CPPS CA updates the network access controller NAC with the latest CPPE identity Whitelist (1.4), e.g. a list of devices allowed in the network and the device's rights in respect to the network, e.g. the CPPS and the slices that contain the CPPE. The new whitelist is updated upon the positively decided enrolment request of the new device newCPPE and contains the new device newCPPE.

After completion of the enrollment process the new device newCPPE is moved into the CPPS and may send further requests.

According to an embodiment the new device newCPPE establishes a network link to the closest network equipment, e.g. a WLAN access point and sends a slice enforcement point SEP registration request 2.1.

Alternatively, or additionally the request 2.1. is sent to one or more devices in its range, of which some or all may be predetermined.

This request 2.1. automatically induces or creates a local registration slice RS shared between the new device newCPPE and the network equipment NE to which the request 2.1 is sent. The registration slice RS is limited to direct point to point communication between the new device newCPPE and the network equipment NE using a limited networking stack, e.g. limited to OSI layer 2. The restricted registration slice RS is used for an authentication process, e.g. using the EAP (extensible authentication protocol). In the embodiment of FIG. 2 IEEE 802.1X EAP TLS as authentication process (2.3-2.12) is depicted that is widely usable amongst WLAN components standardized according to 802.11i.

As long as the new device newCPPE has not been authenticated the new device's communication is proxied by the Networking Equipment NE, e.g. the networking equipment forwards the data sent by the new device newCPPE. As TLS requires end-to-end connectivity, a transient boot slice NSMBS is created. The boot slice NSMBS provides connectivity between the new device newCPPE and the network access controller NAC. After completion of the TLS authentication the Boot Slice NSMBS may be destructed.

On successful completion of the EAP TLS authentication the new device newCPPE is added to the Network Management Slice NMS and the Default Slice DX where acts denoted as (3.x) take place, x ranging from 1 to 6 in the example of FIG. 2.

The network access controller NAC sends a success message 3.1 to the network slice manager, that then sends a configuring slice message 3.2 to the network equipment NE for (re-)configuring the network management slice NMS and the default slice DS. The network equipment NE then sends a configuring message 3.4 to the new device newCPPE for configuring the default slice. Then the network slice manager NSM sends a configuring message 3.5. and 3.6. to the old device CPPE_1 and CPPE_2 respectively.

Then, a message exchange takes place in the default slice DS that now includes the existing devices CPPE_1, CPPE_2, and the new device newCPPE. The existing device CPPE1, CPPE2 and the new device newCPPE now start their discovery and plug-negotiation process by exchanging messages denoted as (4.x). The respective discovery info messages 4.1-4.4 are exchanged between the new device newCPPE and the old devices CPPE_1, CPPE_2. The broadcast of discovery messages is already protected by basic WLAN security mechanisms such as WPA.

Starting with the Plug or P-Negotiation messages (4.5, 4.6) that are used for dynamic negotiation of production network or/and accessibility or/and neighborhood relations or/and cooperation relations, additional application layer communication security mechanisms, such as e.g. TLS or SOAP-security may be used. P-Negotiation messages may be both single-cast and multi-cast.

If the new device newCPPE and the existing device CPPE_2 identify a service applicable for cooperation the devices need to establish a shared production slice PS. The shared production slice PS is initially created by the old device CPPE_2, which sends a request 4.7 to the network slice manager NSM to create a slice for a specific production process "Production X". After receiving a token or slice access capability message 4.8 from the existing device CPPE_2 for the production process "Production X", the new device newCPPE sends a request message 4.9 to the network slice manager NSM that the new device joins a slice dedicated for a specific production process X presenting the received token or slice access capability.

An access capability denotes, for example, a security token granting the right to use or/and initiate a specific functionality or/and service issued by an authorized party.

The capability or token is used by the new device newCPPE to request by message (4.9) the Network Slice Manager to join Production X Slice. The network slice manager NSM sends the respective configure messages 4.10, 4.11 and 4.12 to the network equipment NE, the new device newCPPE and the old device CPPE_2. Thus, the Network Slice Manager NSM configures all affected slice enforcement points SEP, such as network equipment NE and affected CPPE's, by sending messages (4.10), (4.11) and (4.12).

There may be multiple production slices depending on the service types existing in the CPPS. Examples are transportation of work pieces using one or more conveyor belts, joint assembly by cooperation of a robot and a milling machine or marketplace negotiation, e.g. negotiating between more than two entities, e.g. CPPEs, instead of using peer to peer negotiations.

The existing device CPPE_2 and the new device newCPPE share a dedicated network slice, in the example in FIG. 2 the shared production slice PS, that may be used to exchange the collaboration information required for their cooperative service by exchanging respective messages 5.1 and 5.2. in both directions.

Embodiments provide a dynamic implementation of one or more security domains in a SDN (software defined network) analogously to the statically planned physical network topology. Further, system security may be increased by a strict and restrictive network management. Network security may be dynamically configured to the status, e.g. whether within a bootstrapping process where one or more devices are started, or during operation. As well the dynamic adaption may be due to the envisaged task, e.g. transportation, real-time control, service negotiation.

Embodiments introduce within a system several levels that are protected from not verified physical and virtual devices that were not yet configured fully to provide that no fault or unwanted access on a given machine takes place. Trust-worthy parties may gain privileges or prove that they have been allocated privileges to transit from one trust-level to a higher trust level, e.g. promoting from trust level-1 to 2, or generally from a trust level n to a trust level n+1, n being a natural number ranging between 0 and N, N being the overall number of trust levels defined in the network.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present disclosure has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A network configured to permit a new device for use in the network, wherein the network to be used by the permitted new device comprises:
   at least one existing device; and
   at least one virtual sub-network,
   wherein the at least one virtual sub-network is configured to be established within the network, wherein each virtual sub-network of the at least one virtual sub-network is dedicated to one production process, and a certain trust level is configured to be assigned to the at least one virtual sub-network,
   wherein the new device is configured to be permitted into the at least one virtual sub-network after the new device:
   is assigned a first trust level,
   receives a token correlated with the first trust level assigned to the new device, and
   presents the token when the first trust level assigned to the new device corresponds to or comprises the certain trust level assigned to the at least one virtual sub-network, and
   wherein the token is configured to assign the permitted new device a right to access and use the at least one virtual sub-network and perform the production process to which the at least one virtual sub-network is dedicated according to the first trust level assigned to the new device.

2. The network of claim 1, wherein the certain trust level corresponds to at least one security requirement for entering the virtual sub-network, corresponds to at least one capability required in the virtual sub-network, or corresponds to the at least one security requirement and corresponds to the at least one capability required; and
   wherein the assigned right depends on at least one of:
   a type of the new device, a status of an integration of the new device into the network,
a previous accessing process by the new device,
at least one capability of the new device,
a geographic position of the new device, or
a security parameter of the new device.

3. The network of claim 1, wherein the token is configured to be provided by a central unit of the network or by a member of the at least one virtual sub-network.

4. The network of claim 1, wherein the new device is configured to be assigned the first trust level by the network or by being a member of the at least one virtual sub-network within the network.

5. The network of claim 1, wherein the existing device and the permitted new device share the at least one virtual sub-network to perform the production process to which the at least one virtual sub-network is dedicated together.

6. The network of claim 1, wherein the token is configured to be presented by sending a message to a network entity administrating the at least one virtual sub-network directly or by sending the message to a network entity handling communication outside of the network that forwards or induces communication in regard to the access of the new device with the network entity administrating the at least one virtual sub-network.

7. The network of claim 1, wherein the new device is configured to perform at least two production processes, wherein the new device comprises at least two components, that are integrally built or placed at different geographical positions, and the at least two production processes of the new device are distributed amongst the at least two components.

8. A controller configured to coordinate an access of a new device to at least one virtual sub-network of a network, the controller configured to:
   initiate an assignment of a trust level to the new device before permitting the new device access the at least one virtual sub-network, wherein each virtual sub-network of the at least one virtual sub-network is dedicated to one production process; and
   initiate a transmission, when the trust level assigned to the new device corresponds to or comprises a certain trust level assigned to the at least one virtual sub-network, of a token describing a permission granted to the new device to enter the at least one virtual sub-network, describing the certain trust level assigned to the at least one virtual sub-network, or describing the permission granted to the new device to enter the at least one virtual sub-network and describing the certain trust level assigned to the at least one virtual sub-network,
   wherein the token is configured to assign the new device a right to access and use the at least one virtual sub-network and perform the production process to which the at least one virtual sub-network is dedicated according to the trust level assigned to the new device after determining the new device is permitted to join the at least one virtual sub-network.

9. The controller of claim 8, wherein the new device for the at least one virtual sub-network is configured to be chosen by considering security parameters.

10. The controller of claim 8, wherein the controller is configured to be formed by a trustworthy network component on or at each node.

11. A network comprising at least one existing device, a plurality of virtual sub-networks, and at least one controller configured to coordinate an access of a new device to at least one virtual sub-network of the plurality of virtual sub-networks,
   wherein each virtual sub-network of the plurality of virtual sub-networks comprises at least one of:
      an isolated sub-network comprising a certification authority configured for initial communication with the new device entering the network,
      a virtual security management sub-network comprising a network access controller and a certification authority and configured to share information between identity management within the network and network access control,
      a virtual network management sub-network configured to share information amongst the at least one existing device and/or the new device having a right to enforce virtual sub-networks,
      a virtual default sub-network configured to exchange discovery or/and plug-negotiation information between the at least one existing device and the new device,
      a virtual registration sub-network configured for authentication between the new device and a network equipment, and
      a virtual production sub-network, dedicated to one production process, between the at least one existing device and the new device configured to perform the production process,
   wherein the plurality of virtual sub-networks is configured to assign the new device a right to access and use the at least one virtual sub-network of the plurality of virtual sub-networks and perform the production process to which the at least one virtual sub-network is dedicated according to a trust level assigned to the new device after assigning the new device the trust level and determining the new device is permitted to join the network.

12. The network of claim 11, wherein the at least one virtual sub-network comprises a plurality of the existing devices configured to perform the production process together with the permitted new device.

13. A method for integrating a new device in a physical network comprising at least one existing device, wherein, in the physical network, at least one virtual sub-network is assigned a certain trust level and each virtual sub-network of the at least one virtual sub-network is dedicated to one production process, the method comprising:
   assigning a first trust level to the new device;
   receiving, by the new device, a token correlated with the first trust level assigned to the new device;
   permitting the new device into the at least one virtual sub-network upon presentation of the token when the first trust level corresponds to or comprises the certain trust level; and
   assigning the permitted new device a right to access and use the at least one virtual sub-network and perform the production process to which the at least one virtual sub-network is dedicated according to the first trust level assigned to the new device.

14. The network of claim 5, wherein the production process comprises a transportation process, a milling process, or a work piece handling process.

15. The controller of claim 9, wherein the new device for the at least one virtual sub-network is configured to be chosen by considering a used encryption method.

16. The network of claim 11, wherein the network is a production network.

17. The network of claim 2, wherein the token is configured to be provided by a central unit of the network or by a member of the at least one virtual sub-network.

18. The network of claim 17, wherein the new device is configured to be assigned a first trust level by the network or by being a member of the at least one virtual sub-network within the network.

19. The network of claim 1, wherein the token is configured to be presented by sending a message to a network entity administrating the at least one virtual sub-network directly or by sending the message to a network entity handling communication outside of the network that forwards or induces communication in regard to the access of the new device with the network entity administrating the at least one virtual sub-network.

* * * * *